United States Patent [19]
Miljanich

[11] Patent Number: 6,113,049
[45] Date of Patent: Sep. 5, 2000

[54] AUTO CONSOLE CUP ADAPTOR AND ATTACHMENTS

[76] Inventor: Julie A. Miljanich, 901 Ocean Ave., #104, Santa Monica, Calif. 90403

[21] Appl. No.: 09/255,498

[22] Filed: Feb. 23, 1999

[51] Int. Cl.[7] .................................................... A47K 1/08
[52] U.S. Cl. ........................................ 248/311.2; 248/314
[58] Field of Search ........................... 248/311.2, 314, 248/346.11, 229.21, 689, 313, 316.1, 154

[56] References Cited

U.S. PATENT DOCUMENTS

| | | | |
|---|---|---|---|
| 2,167,731 | 8/1939 | Swanstrom | 281/1 |
| 4,071,174 | 1/1978 | Weiner | 224/29 M |
| 4,877,164 | 10/1989 | Baucom | 224/42.44 |
| 4,938,401 | 7/1990 | Weisbrodt et al. | 224/275 |
| 4,969,618 | 11/1990 | Thompson | 248/152 |
| 4,989,742 | 2/1991 | Powell | 220/23.4 |
| 5,048,733 | 9/1991 | Nagy | 224/42.42 |
| 5,086,958 | 2/1992 | Nagy | 224/42.42 |
| 5,106,003 | 4/1992 | Ma | 224/42.42 |
| 5,143,337 | 9/1992 | Tomayko, Jr. et al. | 248/311.2 |
| 5,149,032 | 9/1992 | Jones et al. | 248/154 |
| 5,154,380 | 10/1992 | Risca | 248/154 |
| 5,372,403 | 12/1994 | Puerto | 297/188.17 |
| 5,398,898 | 3/1995 | Bever | 248/154 |
| 5,445,350 | 8/1995 | Rigsby | 248/313 |
| 5,560,578 | 10/1996 | Schenken et al. | 248/313 |
| 5,673,891 | 10/1997 | Fujihara et al. | 248/311.2 |
| 5,704,579 | 1/1998 | Celentino et al. | 248/311.2 |

Primary Examiner—Ramon O. Ramirez
Assistant Examiner—Walter Landry
Attorney, Agent, or Firm—Cislo & Thomas LLP

[57] ABSTRACT

A cup receptacle adaptor which may be ideally useful in the console type of a cup recess or receptacle found in an automobile, but which has broader application and wherein the adaptor is expansible to fit a variety of diameter of recesses or receptacles and wherein the adaptor is suitable for receiving a work configured structure such as a tray, message pad holder or the like and wherein, the adaptor is easily positioned into the cup recess or receptacle by reason of a rotative movement that imparts outward and inward movement to depending portions which fit into the cup receptacle or recess.

12 Claims, 3 Drawing Sheets

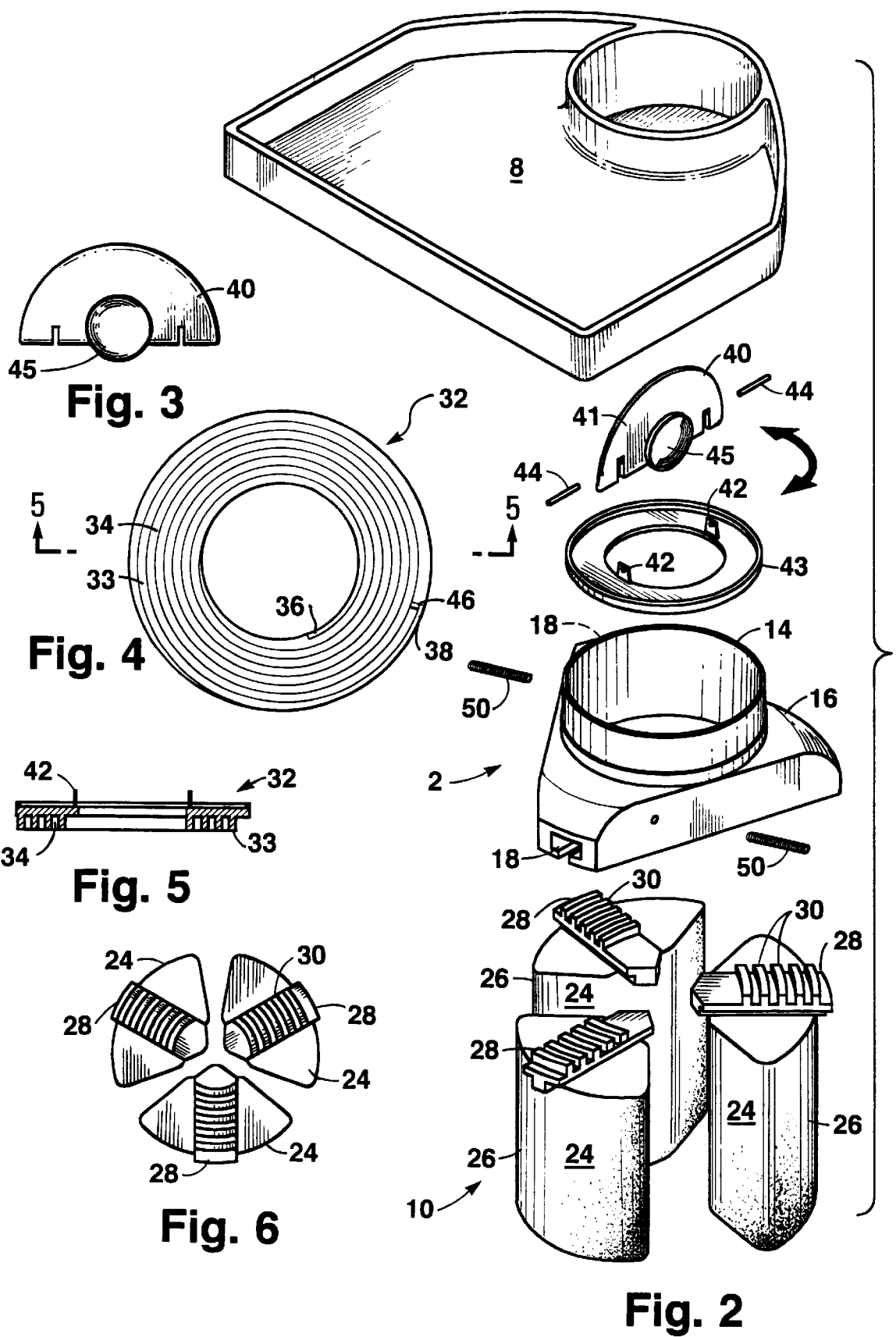

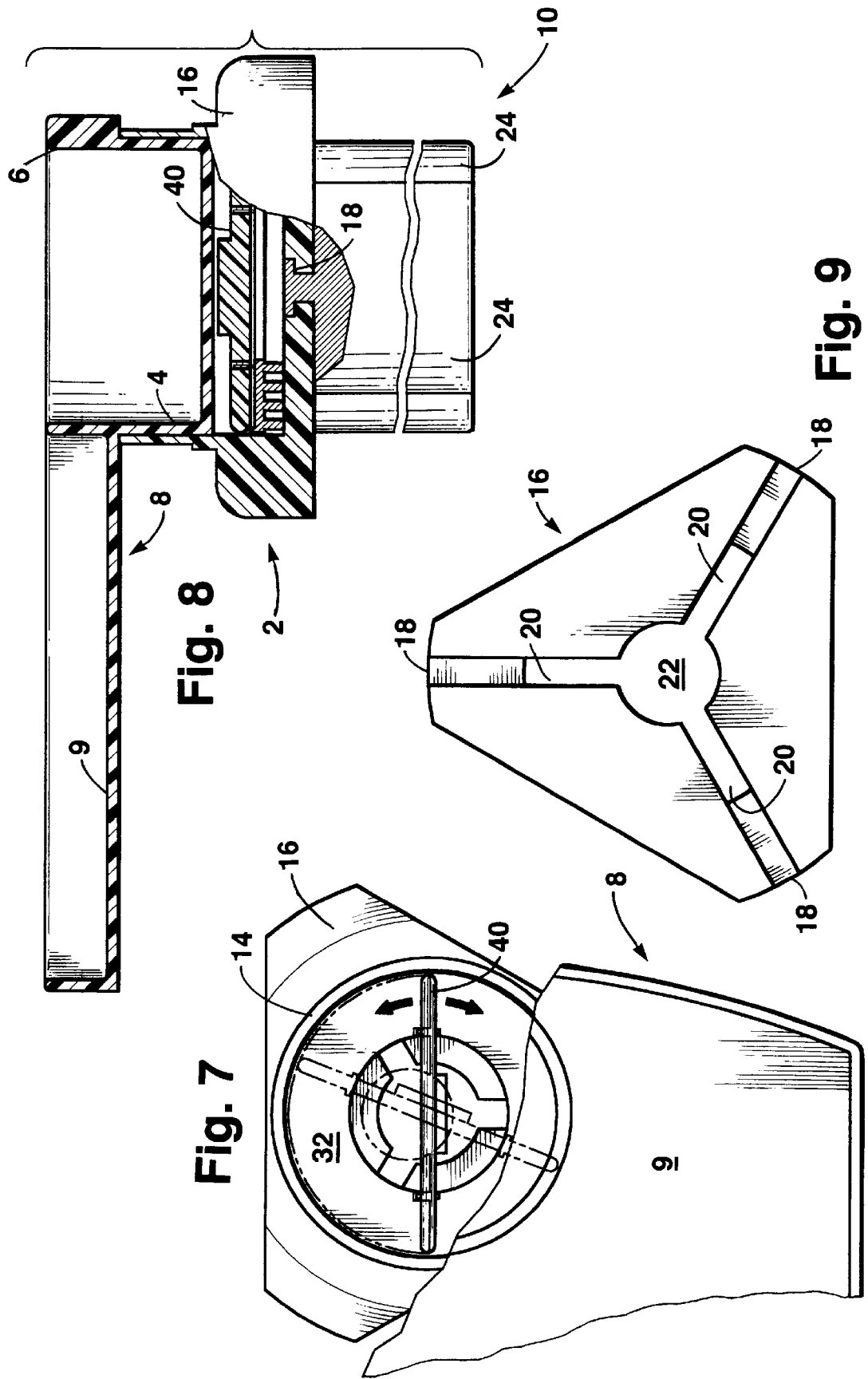

AUTO CONSOLE CUP ADAPTOR AND ATTACHMENTS

BACKGROUND OF THE INVENTION

1. Field of the Invention

This invention relates to an adaptor that fits into a cup receptacle or receiver that is ubiquitously found in automobile consoles and sometimes incorporated in the dashboard or armrests of an automobile. In most instances, a receiving receptacle or recess is molded of plastic and may be openly disposed or may be initially concealed within a console member, for example and upon actuation of a button or the like, a cup holder moves into exposed position in order to receive a coffee mug, beverage cup or the like.

In most instances, the cup holder or receptacle is of an unsuitable size in that there are myriad of sizes of cups and mugs made of styrofoam, plastic, cardboard or other materials. Additionally, the cup recess or receptacle is of sufficient depth to receive only a lower portion of the container that will be inserted therein and has no other use other than for being a cup, mug or bottle receptacle to allow the driver of an automobile to drink a beverage, to rest the container thereof when not drinking or while driving in an automobile.

With today's accelerated lifestyle, automobile accessory designers have sought to come up with various attachments and additions that would allow for a driver, while driving, to do additional tasks as for example, writing notes, making phone calls and the like. Ordinarily, various devices have been suggested and introduced into the marketplace that either attach to a dashboard, ashtray receptacle or a windshield itself, in order to provide a wide variety of tools readily available to the driver. However, none have been completely satisfactory in providing, in the first instance, an adaptor that will fit a variety of cup receptacles or recesses in a snug manner and provide a platform to receive either a cup, mug, etc., itself, or a variety of tool platforms that eases the burden of modern day driving life.

2. Description of the Related Art

As indicated, the prior art has suggested various attachments for securement to an automobile interior for holding writing pads, cups, mugs and even eating trays in a variety of ways, but none have the significant overall attributes of the herein disclosed AUTO CONSOLE CUP ADAPTOR AND ATTACHMENTS.

A search of related art has been conducted and probably the most pertinent patent is Schenkin, U.S. Pat. No. 5,560,578 for ADJUSTABLE HOLDING DEVICE, which has an expandable, dual member that is adapted to be received into an existing stationary drink, container holder, an automobile ashtray or an arm of a chair and also includes a container receiving portion which is adjustable through a somewhat cumbersome carriage and shaft combination in order to accommodate a variety of sized containers to be securely held in position therein.

Other of the more pertinent references found in the search are as follows:

U.S. Pat. No. 4,877,164

This reference is directed to a device for holding cups, cans, and similar articles in vehicles. As shown in FIG. 1, member 10 terminates at one end in an expandable plug mounting means, generally indicated at 16. Plug mounting means 16 is adapted to be rigidly secured into an opening, such as the cigarette lighter opening, of the vehicle. The other end of member 10 forms an adjustable detent-type joint, generally indicated at 18, with one end of the member 12. The other end of member 12 forms a similar adjustable detent-type joint 18 with one end of the member 14, the other end of which terminates in a ring-type coupling means 20. FIG. 5 illustrates an adaptor for use with the system and for readily converting the open ring-type cup holding means 20 to a closed bottom holding means for holding a can, bottle, or other article. As shown, the adaptor 60 comprises a base 62 and a plurality of arms 64 extending upwardly therefrom. Each of the arms 64 terminates in a hook means 66 which is arranged and constructed to snap over and be held by the open ring-type coupling means 20.

U.S. Pat. No. 5,048,733

This reference is directed to an automotive accessory mount. The automotive accessory mount 10 essentially comprises an elongate, cylindrical base portion 11 of an axial length and diameter to define a configuration complementary to that defined by a conventional cigarette lighter receptacle bore 12 formed within a dashboard of a typical automotive vehicle, as shown in FIG. 1. As shown in FIG. 2, securement clips 17 has a rear surface orthogonally aligned relative to the base 11 and a shank member 15. A U-shaped slot 18 is defined about a perimeter of the side and bottom portions of the forward surface 17a of the clip 17 defined by an over-folded continuous flange 19 extending and overlying the forward surface 17a of the clip about side and bottom portions thereof. The clip 17 slidably receives therein a tab plate 20 integrally and orthogonally secured to a connecting rib 21 positioned medially of a rear surface of the tab plate 20 and extending from an upper edge of the tab plate 20 to a distance spaced above a lower edge of the tab plate 20 a distance equal to the depth of the slot 18 to completely accommodate the tab plate 20 within the slot 18.

FIG. 3 is illustrative of an insulated cup 22 with an external cylindrical configuration including a polymeric insulated interior surface 22a. FIG. 5 illustrates a tray 23 formed with a planar upper surface and including a perimeter flange 23a extending orthogonally and upwardly of the edge perimeter defined by the tray 23. FIG. 7 is illustrative of a transparent map holder 25 utilizing a plurality of finger portions 26 extending upwardly and orthogonally relative to a horizontal base 27.

U.S. Pat. No. 5,372,403

This reference is directed to an arm rest writing surface having adjustable angle. Slidable in and out of the opening 12 is a relatively long, narrow drawer 16 that the user can move from the stored position into an extended position. Removably mounted on the usable upper surface 18 of the drawer 16 is a writing pad 24 that is held in the desired position by a spring clip 26. As shown in FIG. 20, a hingedly mounted drink supporting device 170 may be utilized at the front corners of the arm rest 160. As shown in FIG. 21, the basic hingedly mounted device 170 has an inner diameter 172 sufficient to receive a fairly large covered bottle, which may be larger than desirable when the device is being used in connection with a can, or a cup of a standard size. Accordingly, there is provided, as shown in FIG. 21, a toroidally shaped device 176 sized to fit into the pivotally mounting supporting device 170. Additionally, an integral plastic sleeve liner 180 may be used in the central portion of the member 176 in order to prevent snagging friction between the foam ring and a beverage container.

U.S. Pat. No. 4,938,401

This reference is directed to an automobile passage seat divider. As shown in FIGS. 1–3, storage cylinders 10a and 10b serve as the front stabilizers for the unit, which also provide the users of the system with two easily reachable storage cylinders in which to place items such as drinks and snack cups. Insert sleeve, shown as reference numerals 12A, 12B, and 12C, located along the central portion, provides the holding slot in which to insert and securely support the various insert attachment units, such as the insert board unit or the storage insert unit shown in FIGS. 2 and 3. The insert board unit, shown in FIG. 2, is a separate single-piece structure which is to be securely inserted into insert sleeve walls 12a, 12b and 12c. Once inserted, and the entire unit is positioned in the center of the automobile's rear passenger seat, the insert board unit serves as a temporary barrier or divider which separates the passengers on either side of it. The storage insert unit, shown in FIG. 3, is a separate single-piece structure which is to be securely positioned over the rear portion of the divider base unit. The storage insert side walls 22a, rear wall 22b, front wall 22c, and floor board 28 are combined to form a box-like storage chamber. The box-like structure is held in place by use of the insert runner 24 which is to be securely inserted within insert sleeve walls 12a–12c located on the divider base unit.

U.S. Pat. No. 4,989,742

This reference is directed to a tray apparatus. FIG. 1 is a perspective view of tray apparatus 10 showing the base element 12 with the bowl insert 60 and the cup element 100 spaced apart from the base element 12. When insert 60 is oriented properly within the gaps in the sidewall 66 placed over the tabs 24 and 26, the insert 60 may be rotated only a relatively short distance before the face 76 or 76 or the bottom wall 64 at the ends of the sloping wall 72 contact the stop element 26. The same inserting and locking system is used with the cup 100 that is used with insert 60.

Other references found had specific elements, but not in the combination that are relevant to the herein disclosed invention, which overcomes the deficiencies of the prior art and more specifically, is more universal in nature and is adapted to have a myriad of uses other than just holding cups or mugs as will be seen and further, is easily operatable with one hand either while driving or while being in a stationary position.

DISCLOSURE OF THE INVENTION

Basically the invention relates to an adaptor that is intended to be securely and releasably secured in a receiving cup of an automobile console or a cup receptacle wherever it may be positioned in an automobile, as for example, on the floorboard, console, armrests, or as part of the dashboard of an automobile. The adaptor has a male expansible, depending portion that is easily inserted into a receiving receptacle or recess and by simple, rotative movement, is expanded to be releasably and frictionally retained within the receptacle or recess and presents an open, female recess or portion to receive a container or one of a plurality of work station structures in a facile manner. That is, a work platform comprising the attachment may take the form of a message pad holder, cup holder for larger diameter cups, a cellular phone holder, a cosmetic case or any type-structure that would be desirable to be positioned in secure and retained relationship in proximity to the driver of an automobile.

In its simplest form, the invention relates to an automobile console cup or receptacle adaptor, the adaptor comprising the combination of a central portion having an upwardly extending member forming a recess adapted to receive a congruently shaped, depending member to which is affixed one of a plurality of work configured structures. A depending male portion comprises at least one elongate member, with at least the exterior thereof being congruently contoured to the receptacle or recess into which it is positioned and adapted to be inserted into. The at least one elongate member is radially movable relative to the central portion by reason of cooperative thread rotative movement of said at least one elongate member relative to the central portion which supports it, whereby the depending male portion is contractible and expandable within the confines of the console cup receptacle into which it is inserted.

OBJECTS OF THE INVENTION

It is an object of the present invention to provide an adaptor to be utilized in existing cup receiving members in an automobile or elsewhere which greatly expands the usability thereof.

It is another object of the invention to provide an adaptor that is intended to be secured within a cup receptacle or recess of an automobile console or the like and which, in turn, is configured and adapted to receive a cup, bottle or container or one of a plurality of work platforms whether they be trays, message pad holders or the like.

It is still another important object of the invention to provide an adaptor that is to be associated with a cup holder or receptacle, ideally of an automobile, wherein the adaptor is of relatively low cost manufacture having relatively few moving parts which is not subject to breakage and which is easily manipulable in order to achieve the desired end results.

It is another important and even more specific object of the invention to provide an adaptor for a console cup holder of an automobile or other cup recess wherein the adaptor has an expansible lower depending male portion, which upon rotation of a simple structural element radially expands or contracts the depending element making up the male portion so as to rigidly and releasably secure the adaptor within the console cup recess of the automobile or other cup recess and wherein the adaptor has an upper portion comprising a recess which itself can hold a cup or mug or which may receive, in retained and secured releasable relationship, one of a plurality of work structures comprising trays, tables, etc.

It is still an even more important, specific object of the invention to provide an automobile cup receptacle adapter wherein the adaptor comprises a plurality of depending lobe members which are congruently configured to the interior surface of a cup receptacle or a holder with which it is intended to be associated and wherein the expansion and contraction of the members making up the lower depending portion is easily achieved through a rotative movement, which through a thread relationship, causes the lower depending members to move inwardly or outwardly depending upon the direction of rotative movement.

These and other objects of the present invention will become more apparent from the hereinafter following commentary taken in conjunction with the drawings.

BRIEF DESCRIPTION OF THE DRAWINGS

FIG. 2 is an exploded view of the device shown in FIG. 1 illustrating the components thereof;

FIG. 3 shows more detailed construction of one of the elements shown in FIG. 2;

FIG. 4 illustrates the rotative ring component of the structure shown in FIG. 2;

FIG. 5 is a side view of the rotative ring component shown in FIG. 4;

FIG. 6 is a top view of the at least three depending elements having partial cooperative threads thereon;

FIG. 7 is an enlarged, fragmented top view and showing the rotational movement of the assembled device;

FIG. 8 is an enlarged, cross-sectional view showing more details of construction of the device of the present invention; and FIG. 9 is a bottom view of one element of the inventive device of the invention.

DESCRIPTION OF THE PREFERRED EMBODIMENT(S)

Figure 1:
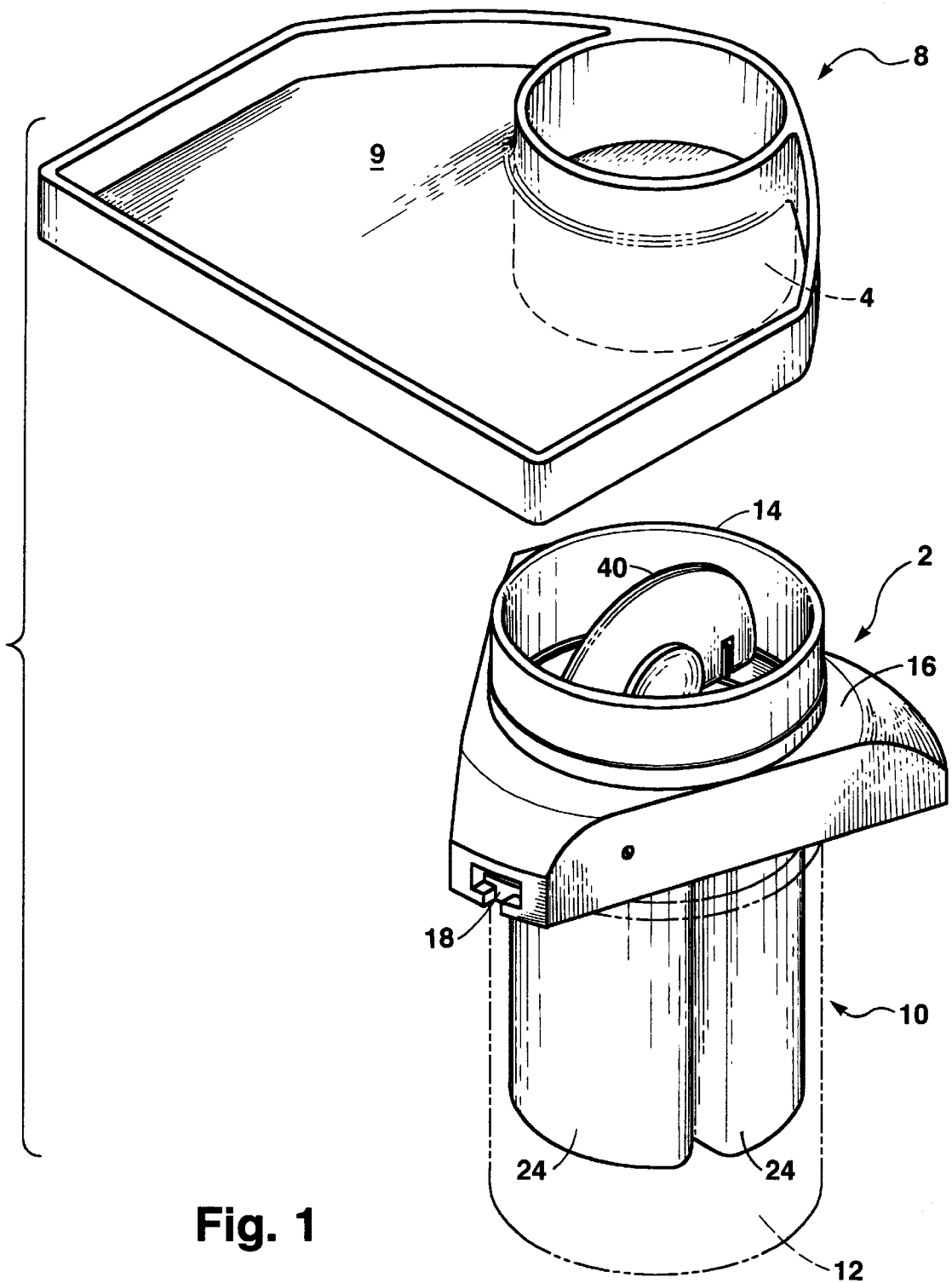
FIG. 1 is a perspective view of the cup adaptor of the invention showing in exploded fashion, one of a plurality of work configured structures, in this instance making up a tray which may be associated therewith.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention. For example, instead of having three depending elongate members which move radially relative to the center of the device, one depending movable member may suffice while one other depending member is stationary. Likewise, instead of three depending members, two or more may be utilized and those of ordinary skill in the art will recognize the modifications and adaptations necessary to achieve these results, all without departing from the spirit of the disclosed invention.

Referring to the drawings wherein like numerals of reference designate like elements throughout, it will be noted that adaptor 2 of the invention is, in this particular instance, illustrated as being associated with work configured structure or tray 8. That is, adaptor 2 is intended to have its lower depending portion 10 received within a cup receptacle or recess, as might be found on an automobile console or the like, illustrated in phantom line in FIG. 1.

While a console recess 12 is indicated, this is for illustrative purposes only as the invention may be used in environments, other than automobiles. The adaptor 2 then receives within its upper recess portion 14 depending male portion 4 of tray 8 which itself has a cup receiving recess 6 but more importantly, a working table or tray portion 9 for purposes that will become apparent as the commentary continues.

Referring to FIG. 2, adaptor 2 is shown in exploded view and illustrates more details of construction. Typically, adaptor 2 may be made of molded plastic, but other materials will readily present themselves to those of ordinary skill in the art and it will be noted that the central portion 16, in this instance, is of triangular shape having the upper portion 14 of circular configuration to receive the bottom of a cup or container or one of a plurality of work structures. Central portion 16 is provided with three spaced grooves 18 having a T-shape configuration in cross-section and forming elongate guide ways 20 terminating in central, angular space 22 as best seen in FIG. 9.

Disposed in each of the guide ways or tracks 18 is depending members 24 each having a depending elongate section of melon-like in cross-section configuration and having curvilinear exterior surface 26 which may be coated or rubberized with an elastomeric material so as to fit into and be snugly received by console receptacle or container receptacle 12 when the depending members 24 are in their fully, outwardly extended position, as will be seen.

The upper portion of each of the members 24 are provided with screw thread portions 28, each of which have upraised, spaced thread-like members 30 of curvilinear configuration adapted to cooperate with and be received into rotative element 32.

It should be noted that the depending members 24 and more specifically, the upper portions 28 are so configured as to be received within the T-shaped slot 18 of central member 16 for radial movement along the track guide 20, inward and outward, relative to the center of central member 16 as will become apparent as the description proceeds.

Ring or rotative member 32, which also may be of molded plastic or of metal, is of scroll design and comprises an upraised continuous protuberance 33 thereby forming continuous groove 34 therebetween of such design that the groove 34 gets narrower as the groove distance approaches the center of the ring or rotative element 32. Groove 34 of ring or rotative element 32 has a beginning or start end 36 and an end 38 which has an upraised abutment 46 such that the elements 30 retained within the groove 34 will not be able to move further. That is, when the upper thread portions 30 of each of the radially movement depending elements 24 are engaged in the scroll groove of rotative element 32, as best seen in FIG. 8, rotation of the rotative or ring member 32 by means of upstanding pivotally mounted actuator member 40, which is secured to the upraised tabs 42 of rotative ring member 32 by means of pins 44, allows for easy clockwise or counter-clockwise rotation of rotative ring member 32. When components of the adaptor 2 are in the assembled form as shown in FIG. 8, rotation of ring or rotative member 32 causes the depending members 24 making up the depending portion 10 of adaptor 2 to move much like a jar cap on a threaded jar, but in this instance, because of the scroll or narrowing of the groove 34 of the rotative element 32, causes each of the elements 24 to either move radially inwardly with respect to the center of center member 16 or radially outwardly.

In order to retain rotative member 32 within center portion 16, pins or set screws 50 are utilized to engage the raised surface 43 of rotative ring element 32 in order to retain the assembly in secure relationship. The depending members 24 are captively retained within the guides 20 of central element 16 by reason of the upraised abutment end 46 of groove 34 which prohibits further movement of the elements 24 along the track 20 when the ring element 32 is rotated so as to move the elements 24 into their outer most position relative to the center of central portion or member 16.

Molded on the upper surface 41 of tab 40 is circular component 45 which may act as a means of receiving a finger for example of a human hand, to rotate the pivotally mounted tab member 40 from its planer position, as shown in FIG. 8, into the rotative actuating position as shown in FIG. 1. That is, when it is desired to open or close the depending portion 10 of adaptor 22, one merely rotates the tab member 40 into the upright position as shown in FIG. 1 and rotates the rotative member 32 either clockwise or counter clockwise to radially move the depending elements 24 towards or away from the center of central member 16 so as to securely engage adapter 2 within a container receptacle 12 as previously described.

Once the exterior, annular or curvilinear surface 26 of each of the members 24 are fully engaged, the tab 40 is rotated downwardly into its planer position as shown in FIG. 8 and is ready to receive either the male depending portion 4 of tray 8 for example or alternately, to receive a cup therein which would be supported by the circular portion 45 of tab 40.

While the adaptor 2 has been described and illustrated as having three depending members 24, it should be apparent to those of ordinary skill in the art that two members would suffice and appropriate modifications made to adaptor 2 or alternately, more than the three depending members 24 may be employed. Indeed, the central member 16 may be formed or molded with a stationary component taking the configuration of one of the depending elements 24 and having but one moveable element in order to properly secure the adaptor 2 within any given recess for which practice of the invention may be desired. All such changes and modifications will readily make themselves apparent to those of ordinary skill in the art and are intended to be covered by the appended claims.

Thus, there has been disclosed an adaptor for a cup receptacle or container, ideally normally found in automobiles, but which may have broader application wherever such recesses or receptacles are found and wherein it is desired to be able to modify or make the same adaptable to other end uses.

Thus, in its most practical application the invention is easily positionable in for example the console recess of an automobile and by simple rotative movement, the adaptor is snugly and securely retained within the receptacle to thereby provide an upraised cup, mug or other container receiver or in its most usual application, adapted to receive a tray, table, message pad holder or other work station member just so long as it has a depending male portion which is congruently shaped and adapted to fit into the receiving female portion of the adaptor. All of this makes the work station attachments able to conform to the user's needs, particularly when driving an automobile.

While the present invention has been described with regards to particular embodiments, it should be recognized that additional variations of the present invention other than those described and alluded to may be devised without departing from the inventive concept, as covered by the appended claims.

What is claimed is:

1. For a cup receptacle an adaptor comprising the combination:
   a central portion having an upwardly extending member forming a recess adapted to receive a congruently shaped depending member to which is affixed one of a plurality of work configured structures and a depending male portion comprising at least one elongate member, at least the exterior of which is adapted to be congruently contoured to the receptacle into which said depending male portion is adapted to be inserted into, said at least one elongate member having thread means thereon and being radially movable relative to the center of said central portion by reason of cooperative thread radial, rotative movement of said at least one elongate member relative to said central portion, whereby said depending male portion is radially inwardly and outwardly moveable within the confines of said cup receptacle.

2. The adaptor in accordance with claim 1 which includes two additional elongate members and wherein said central portion has spaced tracks wherein each of said at least three elongate members are captively retained for transitory and radial movement towards and away from the center of said central portion.

3. The adaptor in accordance with claim 2 wherein said thread means comprises an upper surface of each of said at least three elongate members being provided with spaced, curvilinear ridges adapted to cooperate with a ring member supported by said central portion so that by rotative movement thereof, said at least three elongate members move inwardly and outwardly through a thread engaging rotative movement.

4. For a cup receptacle an adaptor comprising the combination:
   a central portion having spaced tracks and an upwardly extending member forming a recess adapted to receive a congruently shaped depending member to which is affixed one of a plurality of work configured structures and a depending male portion comprising at least three elongate members, the upper surface of each of said at least three elongate members being provided with spaced, curvilinear ridges adapted to cooperate with a ring member supported by said central portion so that by rotative movement thereof, said at least three elongate members move inwardly and outwardly through a thread engaging rotative movement, at least the exterior of said at least three elongate members being adapted to be congruently contoured to the receptacle into which said depending male portions are adapted to be inserted into, said at least three elongate members being captively retained within said spaced tracks for transitory and radial movement towards and away from the center of said central portion and being radially movable relative to the center of said central portion by reason of cooperative thread rotative movement of said at least three elongate members relative to said central portion, whereby said depending male portions are radially inwardly and outwardly moveable within the confines of said cup receptacle.

5. The adaptor in accordance with claim 4 wherein said ring member is supported by said central portion and has a central tab which is graspable by the thumb and forefinger of a human hand so that the same may be easily rotated in clockwise and counter-clockwise directions.

6. The adaptor in accordance with claim 5 wherein the exterior surface of said at least three elongate members is coated with an elastomeric material.

7. The adaptor in accordance with claim 6 wherein one of a plurality of work configured structures comprises a tray having a depending male portion congruently shaped to be received within said recess of said central portion and the surface thereof is configured to have a recess for receiving a cup therein.

8. The adaptor in accordance with claim 7 wherein said tab is rotatable from a planar position relative to said ring member to a normal position which is upstanding relative thereto, to allow easy grasping by the thumb and forefinger of a human hand.

9. The adaptor in accordance with claim 8 wherein the bottom surface of said ring member is provided with spaced, congruent grooves forming a spiral configuration to cooperatively engage the spaced, curvilinear ridges at the upper surface of said at least three elongate members.

10. The adaptor in accordance with claim 9 wherein the cooperative curvilinear ridges and spaced threads of said ring member act to captively retain each of said at least three elongate members with respect to said central portion.

11. The adaptor in accordance with claim 10 wherein said adaptor is fabricated of molded plastic and said cup receptacle is one found in automobiles.

12. For a cup receptacle an adaptor comprising the combination:

a central portion having an upwardly extending member forming a recess adapted to receive a congruently shaped depending member to which is affixed one of a plurality of work configured structures and a depending male portion comprising at least three elongate members, at least the exterior of which are adapted to be congruently contoured to the receptacle into which said depending male portion is adapted to be inserted into, said at least three elongate members being cooperatively associated with a rotative ring member whereby radial movement relative to the center of said central portion is obtained by reason of cooperative thread rotative movement of said at least three elongate members in cooperation with said rotative ring member relative to said central portion is obtained, whereby said depending male portion is radially inwardly and outwardly moveable within the confines of said cup receptacle and wherein the upper surface of each of said at least three elongate members is provided with spaced, curvilinear ridges adapted to cooperate with said ring member supported by said central portion so that by rotative movement thereof, said at least three elongate members move inwardly and outwardly through a thread engaging rotative movement.

* * * * *